(12) United States Patent
Dreher et al.

(10) Patent No.: US 11,499,642 B2
(45) Date of Patent: Nov. 15, 2022

(54) PRESSURE ACTUATED VALVE WITH SHOCK ABSORBER

(71) Applicant: Festo SE & Co. KG, Esslingen (DE)

(72) Inventors: Markus Dreher, Stuttgart (DE); Mark Kroll, Esslingen (DE)

(73) Assignee: Festo SE & Co. KG, Esslingen (DE)

( * ) Notice: Subject to any disclaimer, the term of this patent is extended or adjusted under 35 U.S.C. 154(b) by 0 days.

(21) Appl. No.: 17/230,374

(22) Filed: Apr. 14, 2021

(65) Prior Publication Data

US 2021/0324959 A1    Oct. 21, 2021

(30) Foreign Application Priority Data

Apr. 15, 2020   (DE) .......................... 102020204754.5

(51) Int. Cl.
  *F16K 1/52*    (2006.01)
  *F16K 47/02*   (2006.01)
  *F16K 31/122*  (2006.01)

(52) U.S. Cl.
  CPC ............ *F16K 1/523* (2013.01); *F16K 31/122* (2013.01); *F16K 47/023* (2013.01)

(58) Field of Classification Search
  None
  See application file for complete search history.

(56) References Cited

U.S. PATENT DOCUMENTS 2,040,591 A * 5/1936 Barrett ................. G05D 16/163
                                                 251/26
3,301,274 A * 1/1967 Kenney ................. F16K 31/122
                                               137/625.66

(Continued)

FOREIGN PATENT DOCUMENTS

DE    2651398 A1    5/1978
DE    8807514 U1    8/1988
(Continued)

OTHER PUBLICATIONS

DE202009007123, PE2E Search Machine Translation, 2009 (Year: 2009).*

*Primary Examiner* — Daphne M Barry
(74) *Attorney, Agent, or Firm* — Hoffmann & Baron, LLP

(57) ABSTRACT

A valve, with a valve housing, through which process medium can flow and in which a valve seat which surrounds a throughflow opening is arranged, to which valve seat a valve element which is arranged on a spindle is assigned in a manner such that the valve element by way of an actuation travel of the spindle is movable between a shut-off position, in which the valve element sealingly bears on the valve seat in a process-medium-tight manner, and an open position, in which the valve element is lifted from the valve seat, and with a fluid-actuated valve drive which includes a drive housing and a drive wall which together with the spindle forms a drive unit and which separates two working spaces from one another, of which working spaces at least one can be subjected to pressure, and with a travel limitation device which for limiting the opening travel of the spindle includes a stop element which is fastened to the drive housing and which with an end section which includes a stop surface projects into a travel limitation space, in which the drive unit can strike upon the stop surface for limiting the opening travel, the travel limitation space is constantly under atmospheric pressure and the stop element is formed by a shock absorber housing of a shock absorber.

15 Claims, 4 Drawing Sheets

(56) References Cited

U.S. PATENT DOCUMENTS

| | | | | |
|---|---|---|---|---|
| 3,404,703 A | * | 10/1968 | Marx | F16K 31/18 |
| | | | | 137/390 |
| 2009/0050832 A1 | * | 2/2009 | Ejiri | F16K 7/14 |
| | | | | 251/213 |
| 2017/0175923 A1 | * | 6/2017 | Zaragoza Labes | |
| | | | | F16K 31/1221 |

FOREIGN PATENT DOCUMENTS

| | | |
|---|---|---|
| DE | 202009007123 U1 | 8/2009 |
| EP | 2719932 A1 | 4/2014 |

\* cited by examiner

PRESSURE ACTUATED VALVE WITH SHOCK ABSORBER

BACKGROUND OF THE INVENTION

The invention relates to a valve, with a valve housing, through which process medium can flow and in which a valve seat which surrounds a throughflow opening is arranged, to which valve seat a valve element which is arranged on a spindle is assigned in a manner such that the valve element, by way of an actuation travel of the spindle, is movable between a shut-off position, in which the valve element sealingly bears on the valve seat in a process-medium-tight manner, and an open position, in which the valve element is lifted from the valve seat, and with a fluid-actuated valve drive which comprises a drive housing and a drive wall which together with the spindle forms a drive unit and which separates two working spaces from one another, of which working spaces at least one can be subjected to pressure, and with a travel limitation device which for limiting the opening travel of the spindle comprises a stop element which is fastened to the drive housing and which with an end section which comprises a stop surface projects into a travel limitation space, in which the stop unit can strike upon the stop surface for limiting the opening travel.

Travel limitation devices or travel limiters on process valves have been known for some time. Such travel limiters are suitable for limiting the opening travel of the valve element, by way of the movement of the spindle along the actuation device being limited given an opening movement. It is further known to use travel limiters for the limitation of the opening and closure travel.

The most common construction type of such travel limitations are adjustable screws or nuts which are are screwed to a threaded section of the spindle or of a spindle extension and are secured by counter nuts.

A rising hand valve with a travel limitation is described in EP 2 719 932 B1. The travel limitation comprises a stop element in the form of a threaded nut with an outer thread which is screwed in a holder in the form of a threaded sleeve with an inner thread. The threaded sleeve is connected to the hand wheel of the hand valve in a rotationally fixed manner. In order to change the opening travel, the position of the threaded nut in the threaded sleeve is changed by way of screwing in or out. A coupling element serves for this, said coupling element coupling the hand wheel to the spindle in a manner such that the rotation movement of the hand wheel is converted into an upwards or downwards movement of the spindle. The coupling between the hand wheel and the spindle can be interrupted, by which means the threaded nut can be screwed in the threaded sleeve for setting the desired opening travel.

A problem of such travel limitations of the initially mentioned type are hard knocks which occur particularly on opening, with the abutting of the spindle or of the spindle extension upon the stop element of the travel limitation. This leads to a high loading of the valve. The aforementioned hard knocks occur in particular with valves with a so-called overseat onflow, concerning which the fluid pressure of the process medium presses the valve element onto the valve seat in its shut-off position. On opening the valve element, a high force is necessary by way of the valve drive, in order to lift the valve element from the valve seat, since one must additionally work against the fluid pressure of the process medium. From a certain opening travel of the valve element, the pressure which is caused by the process medium breaks down and the valve element with the spindle rushes upwards and strikes the stop in a violent manner. This movement is yet assisted by the process medium which now flows via the throughflow opening and which presses the valve element in the direction of the open position.

SUMMARY OF THE INVENTION

It is therefore the object of the invention to create a valve of the initially mentioned type which on operation is subjected to a less high loading than the valves known in the state of the art.

This object is achieved by a valve with the features of the independent claim 1 and with the features of the independent claim 13. Further developments of the invention are represented in the dependent claims.

The valve according to the invention and according to claim 1 is characterised in that the travel limitation space is constantly under atmospheric pressure and that the stop element is formed by a shock absorber housing of a shock absorber, said shock absorber being fixed to the drive housing and comprising a shock absorber element which projects in the direction of the stop unit and is movably mounted relative to the shock absorber housing.

The shock absorber prevents a hard impact of the drive unit on hitting the stop surface of the stop element. The loading of the valve is reduced and the service life increased by way of this. A further aspect is the fact that the travel limitation space is constantly under atmospheric pressure, thus is not situated in any pressure-impinged working chamber of the valve drive. By way of this, the exchange of the travel limitation device is possible in-situ, which means without the interruption of the fluid impingement of the valve drive. This permits a rapid, inexpensive change of the travel limitation device, for example the exchange of the shock absorber.

Concerning a further development of the invention, the travel limitation space is arranged in a manner connecting axially to the working chambers and is separated from the adjacent working chamber by way of a separating wall, wherein a stop plunger which can interact with the shock absorber element and which belongs to the drive unit passes through the separating wall in a slidingly displaceable manner. The travel limitation space can therefore be designed separately from the working chambers. Alternatively however, it would also be conceivable for the travel limitation space to be the working chamber of the valve drive which is not subjected to pressure, in the case of a valve drive which acts at one side. In this case, the shock absorber housing and the shock absorber element can project into this working chamber which is not subjected to pressure.

In a particularly preferred manner, the fluid-actuated valve drive is designed as a fluid-actuated piston drive, with a drive wall in the form of a drive piston. Alternatively, it would however also be conceivable to design the fluid-actuated valve drive as a fluid-actuated membrane drive, wherein in this case the drive wall would be a flexible membrane.

Concerning a further development of the invention, the stop plunger of the drive unit is designed as a piston rod which is connected to the drive piston. The drive unit thus expediently in the case of a fluid-actuated piston drive consists of the spindle, the drive piston and the piston rod. In the case of a travel limitation space which is formed by the working chambers, the piston rod is then designed as a stop plunger which passes through the separating wall in a slidingly displaceable manner.

Concerning a further development of the invention, the shock absorber housing is displaceably mounted on the drive housing in the axial direction for setting the opening travel.

Expediently, a screw connection serves for the displaceable mounting of the shock absorber housing with respect to the drive unit. For example, it would be possible to provide a through-opening which is formed on the drive unit with an inner thread and to provide the shock absorber housing with an outer thread.

Concerning a further development of the invention, the drive housing comprises a base housing part which annularly encompasses the working chambers, and a stop housing part which is connected to this via the separating wall and whose upper terminating wall is passed through by the shock absorber housing.

In a particularly preferred manner, the stop housing part is designed in a beaker-like manner and comprises a housing chamber which is open to the working chambers, wherein the separating wall which together with the housing chamber forms the travel limitation space is arranged in the region of an opening of the housing chamber.

It is possible for the base housing part to comprise a base section, on whose inner wall the separating wall is fastened and to have a lid section which has a lid opening, through which the stop housing part passes.

In a particularly preferred manner, the stop housing part is fastened to the separating wall by way of fastening means. It is possible for the fastening means to be designed as screw fastening means. The releasable fastening of the stop housing part on the separating wall permits the exchange of the shock absorber also by way of releasing the componentry of the stop housing part and the shock absorber from the separating wall, wherein then in a subsequent step the shock absorber can be separated from the stop housing part.

Concerning a further development of the invention, a throughflow channel, through which process medium can flow and which has a channel longitudinal axis passes through the valve housing, wherein the valve seat comprises a seat surface which is aligned obliquely to the channel longitudinal axis. Such valves are also denoted as angle seat valves. Alternatively, it is also conceivable for a spindle axis of the spindle to be aligned perpendicularly to the channel longitudinal axis. Such valves are also known as straight seat valves.

In a particularly preferred manner, the valve element in the shut-off position is arranged upstream of the throughflow opening in the flow direction. Such an arrangement of the valve with regard to the throughflow opening effects an overseat onflow of the valve element.

The invention further relates to a valve. The valve according to the invention is characterised in that the stop element is formed by a shock absorber housing of a shock absorber which is fixed to the drive housing and which comprises a shock absorber element which projects in the direction of the stop unit and which is movably mounted relative to the shock absorber housing.

The valve is directed to such an "angle seat valve". In particular, concerning such valves, in the state of the art hard knocks upon the stop element occur on opening. For this reason the invention relates to the combination of an angle seat valve with a shock absorber.

In view of the exchangeability of the shock absorber, it is advantageous if the travel limitation space is constantly under atmospheric pressure. However, an embodiment concerning which the travel limitation space is not under atmospheric pressure, for example forms the working space of the valve drive which is subjected to fluid pressure, is also conceivable.

The valve element in the shut-off position is expediently arranged in front of the throughflow opening in the throughflow direction.

BRIEF DESCRIPTION OF THE DRAWINGS

A preferred embodiment example of the invention is represented in the drawing and is explained hereinafter. In the drawing are shown in.

DETAILED DESCRIPTION

Figure 1:
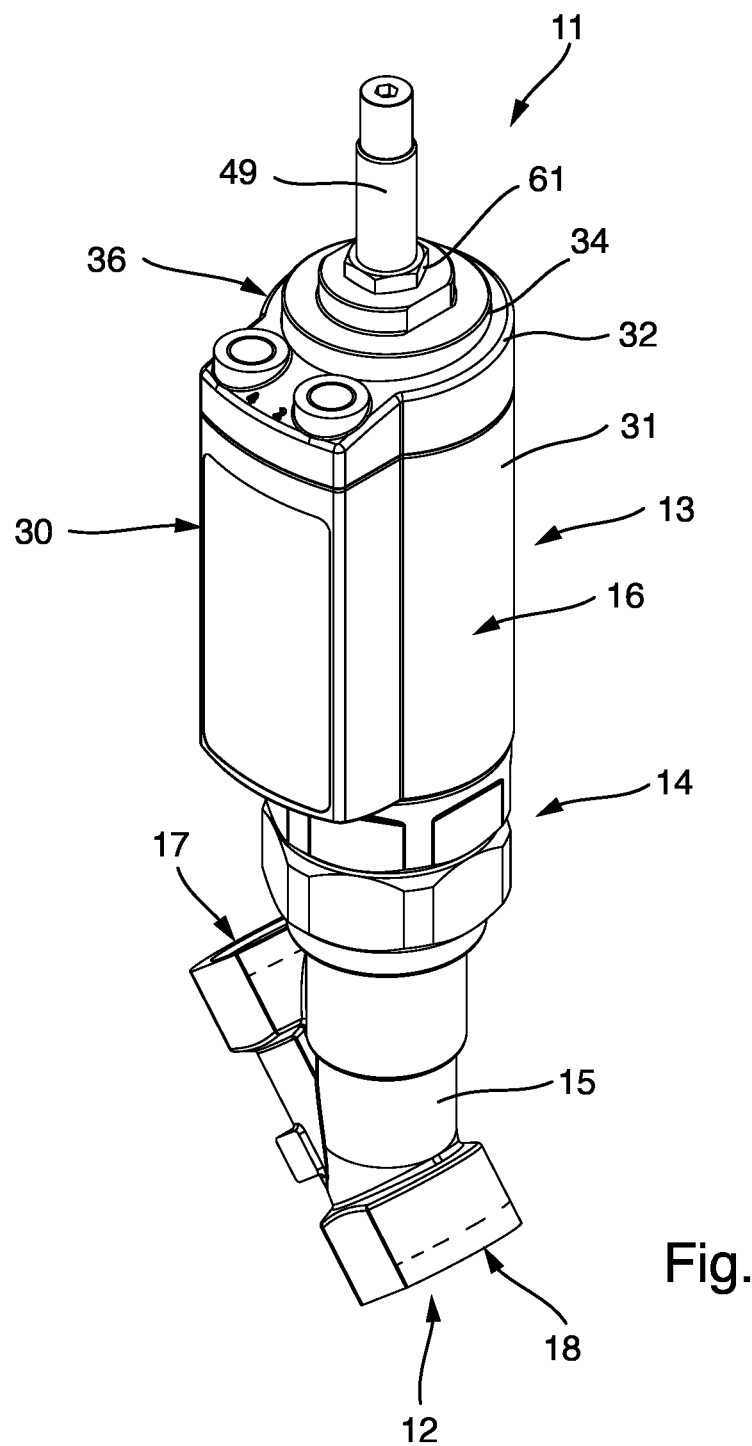
FIG. 1 a perspective representation of a preferred embodiment example of the valve according to the invention, FIG. 2 a longitudinal section through the valve of FIG. 1, wherein the valve element is situated in the shut-off position, FIG. 3 a longitudinal section through the valve of FIG. 1, wherein the valve element is situated in the open position and the drive unit has hit the stop element of the travel limitation device and FIG. 4 a longitudinal section through the shock absorber which is shown in the FIGS. 1 to 3.

FIGS. 1 to 4 show a preferred embodiment example of the valve 11 according to the invention. The valve 11 is suitable for being used as a process valve in the processing industry. Hereinafter, the valve 11 according to the invention is explained by way of example on the basis of an angle seat valve. However, the invention can also be applied to a straight seat valve or a diaphragm valve.

As is particularly shown in FIG. 2, the valve 11 has a valve fitting 12 (hereinafter merely called fitting 12 for the sake of simplicity) and a valve drive 13 (merely called drive 13 for the sake of simplicity). Furthermore, the valve 11 comprises a valve housing 14 which consists of a fitting housing 15 and of a drive housing 16. A throughflow channel 19 which extends between an inlet 17 and an outlet 18 is formed in the fitting housing 15 of the fitting In the case of a use in the foodstuff industry, the fitting housing 15 expediently consists of stainless steel. If aggressive substances, for example acids are used as process media, then the fitting housing 15 expediently consists of plastic material which has a greater chemical resistance with respect to such substances.

The throughflow channel 19 comprises a channel longitudinal axis 20. A throughflow opening 21 which is surrounded by an annular valve seat 22 is located in the throughflow channel 19 between the inlet 17 and the outlet 18. Expediently, the valve seat 22 is designed in a circular manner Theoretically however, an oval shape of the valve seat would also be conceivable.

Figure 2:
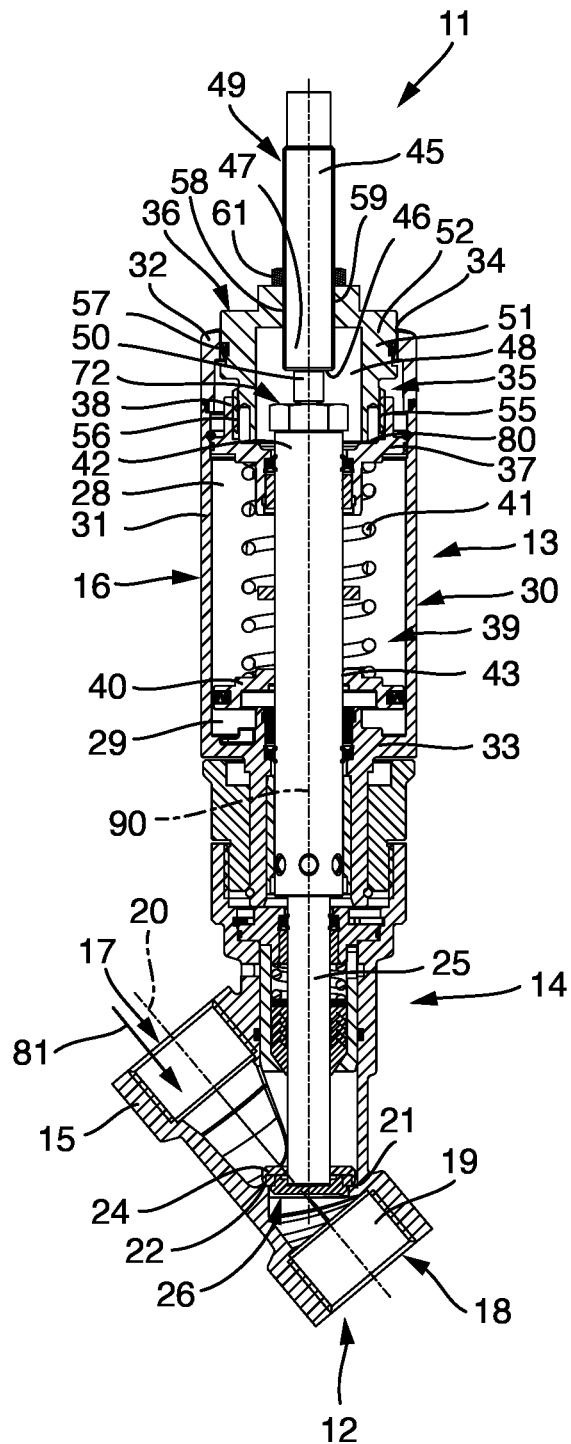
Figure 3:
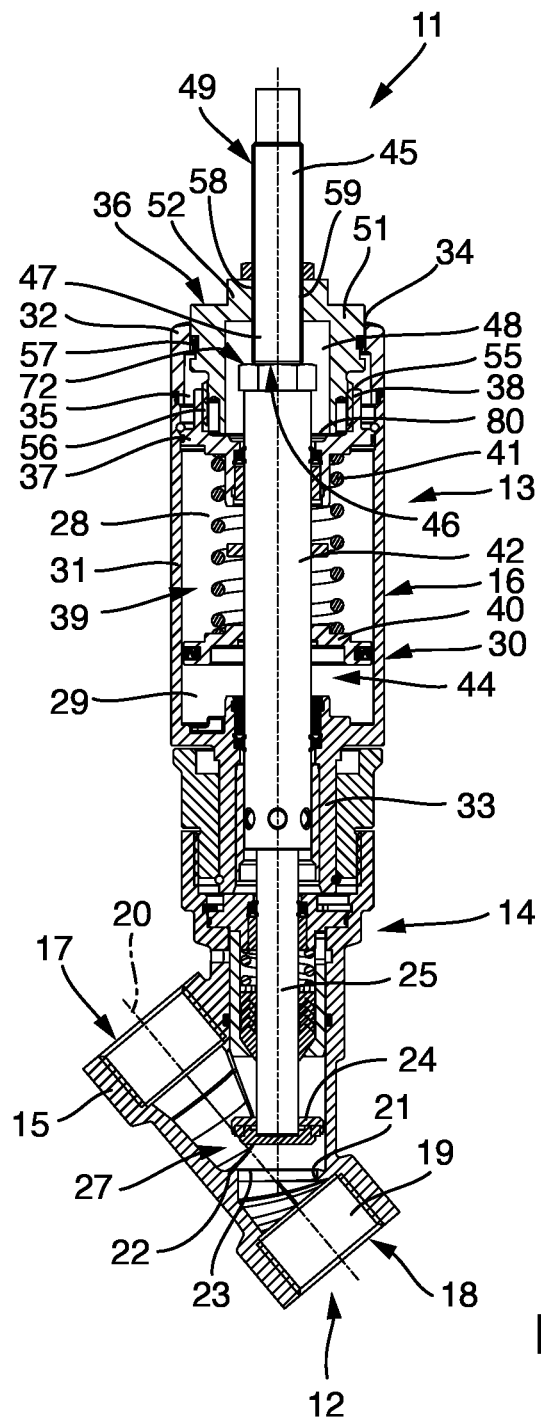

As is particularly shown in FIGS. 2 and 3, the valve seat 22 comprises a seat surface 23 which is aligned obliquely to the channel longitudinal axis 20. This angled arrangement of the channel longitudinal axis 20 and the seat surface 23 is also denoted as an "angle seat" so that the valve 11 as a whole can be denoted as an "angle seat valve".

A valve element 24 which for its part is arranged on a spindle 25 which is provided with a spindle axis 90 is assigned to the valve seat 22.

The valve element 24 by way of an actuation travel of the spindle 25 is movable between a shut-off position 26 (FIG. 2), in which the valve element 24 bears on the valve seat 22 in a fluid-tight or process-medium-tight manner, and an open position 27 (FIG. 3), in which the valve element 24 is lifted from the valve seat 22.

As is particular shown in FIG. 2, the valve element 24 is arranged upstream of the throughflow opening 21 in the shut-off position. In this so-called "overseat onflow", the pressure which is caused by the process medium which flows in a throughflow direction 81 (FIG. 2) acts upon the valve element 24 and presses this onto the valve seat 22 additionally to the holding force which is caused by the valve drive 13.

The actuation travel of the spindle 25 is generated by the valve drive 13 which with its drive housing 16 is coupled to the fitting housing 15 of the fitting 12.

By way of example, the valve drive 13 is shown by way of a fluidic linear drive in the form of a pneumatic piston drive. Alternatively, linear drives other than a pneumatic piston drive, for example a membrane drive, are also conceivable.

As is particularly shown in FIGS. 2 and 3, the drive housing 16 comprises a base housing part 30 which annularly encompasses working chambers 28, 29 which are described in more detail hereinafter. The base housing part 30 comprises a hollow-cylindrical housing body 31 which at the end side is closed in a fluid tight manner with a housing lid 32, 33. In the shown exemplary case, the lower housing lid 33 is designed as one piece with the housing body 31, whereas the upper housing lid 32 as a separate lid component is fastened to the upper face-side end of the housing body 23. The upper housing lid 32 comprises an in particular circularly round lid opening 34.

The housing body 31 can consist of stainless steel. Alternatively, a housing body of plastic would also be conceivable. A further alternative is a housing body of aluminium, for example as an aluminium extrusion press profile. In this case, the aluminium housing body 31 could yet be lined with a stainless steel sheath.

As is particularly shown in the FIGS. 2 and 3, an attachment interface 35, on which an additional device which is necessary or useful for the operation of the valve is attached, in particular in a releasable manner, is located on the axial rear side of the housing body 31.

The additional device in the described exemplary case is a travel limitation device 36. The attachment interface 35 comprises a disc-like base section in the form of a separating wall 37 which is located within the inner wall of the housing body 31 and which forms the upper termination of the housing body 3. The upper housing lid 32 arches over the separating wall 37 and is connected to the wall of the housing body 31, wherein the separating wall 37 is arranged within the housing body 31 and in sealed there in a fluid-tight manner with respect to the inner wall of the housing body 31 by way of a seal.

The separating wall 37 of the attachment interface 35 is connected to a connection pipe stub 38 which projects upwards away from the valve element 24 and on which the travel limitation device 36 is fastened in a manner which will be described in more detail hereinafter.

The lower housing lid 33 and the separating wall 37 define a working space 39, in which a drive wall 40 in the form of a drive piston is movably guided. The drive wall 40 in the form of a drive piston subdivides the working space 39 into two working chambers 28, 29. In the exemplary case, a single-acting piston drive is represented, concerning which one of the two working chambers 28, 29, in the exemplary case the lower piston chamber 29, can be subjected to pressurised air, whereas a restoring spring 41 is arranged in the other, in the exemplary case upper piston chamber. Herein, the arrangement is selected such that the restoring spring 41 presses the drive wall 40, thus the drive piston downwards given a de-vented first working chamber 29, by which means the coupled spindle 25 and the valve element 24 which is connected thereto are pressed upon the valve seat 22. Such a design is also denoted as normally closed.

The drive wall 40, thus in the exemplary case the drive piston and the spindle 25 together form a drive unit 44. If the first drive chamber 29 is subjected to pressurised air, then the drive unit 41 is pressed upwards against the restoring force of the restoring spring 41, by which means lastly the valve element 24 lifts from the valve seat 22.

The drive wall 40 in the form of a drive piston is designed in a plate-like manner and is fixedly connected to a stop plunger 42 which is described in more detail hereinafter and which is led via a through-opening 43 through the drive piston and out of the working space 39 via a further through-opening 80 which is formed in the separating wall. The stop plunger 42 in the described exemplary case is designed as a piston rod and is part of the previously described drive unit.

As already mentioned, the valve 11 comprises a travel limitation device 36 which for limiting the opening travel of the spindle 25 comprises a stop element 45 which is fastened to the drive housing 15 and with an end section 47 which comprise a stop surface 46 projects into a travel limitation space 48, in which the drive unit 44 can strike upon the stop surface 46 for limiting the opening travel.

The travel limitation space 48 according to the preferred embodiment example is constantly under atmospheric pressure. In an example which is not represented, it would however also be conceivable for the travel limitation space 48 not to be under atmospheric pressure, but to form a pressure-subjected working chamber of the valve drive.

A significant aspect of the invention is that the stop element 45 is formed by a shock absorber housing of a shock absorber 49, said shock absorber being fixed on the drive housing and comprising a shock absorber element 50 which projects in the direction of the drive unit 44 and is movably mounted relative to the shock absorber housing.

As is particularly shown in FIGS. 2 and 3, the drive housing 16 additionally to the base housing part 30 comprises a stop housing wall 51 which is connected to this via the separating wall 37 and whose upper terminating wall 52 is passed through by the shock absorber housing, thus the stop element 45.

The stop housing part 51 is designed in a beaker-like manner and comprises a housing chamber which is open to the upper working chamber 28, wherein the separating wall 37 which together with the housing chamber forms the travel limitation space 48 is arranged in the region of an opening 45 of the housing chamber. As is further shown in FIGS. 2 and 3, the stop housing part 51 which belongs to the travel limitation device 36 is inserted via the lid opening 34 into the inside of the hollow-like lid and there is fastened to the separating wall and specifically to the connection stub 38, by way of fastening means. Expediently, the connection stub 38 of the attachment interface 35 which is connected to the separating wall 37 comprises an inner thread 55, into which an outer thread 56 which is formed on the outer periphery of the stop housing part 51 can be screwed. Furthermore, an annular seal 57 for sealing the transition between the stop housing part 51 and the upper wall of the lid is located on the outer periphery of the stop housing part 51. The shock absorber housing, thus the stop element 45 is mounted on the stop housing part 51 in a displaceable manner in the axial direction for setting the opening travel. For this, the stop housing part 51 comprises a through-opening 58 which comprises an inner thread 59.

Figure 4:
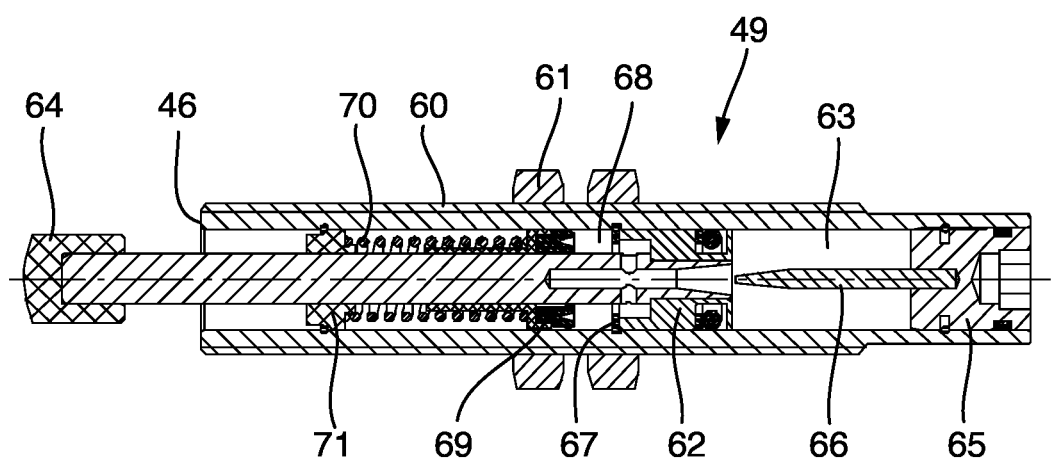

As is particularly shown in FIG. 4, an outer thread 60 is located on the lateral surface of the shock absorber housing, so that the shock absorber 49 can be screwed into the inner thread of the through-opening 58. If the desired screw-in depth which simultaneously sets the axial position of the stop surface 46 is reached, then this position is fixed by way of a counter-nut 61.

As is particularly shown in FIG. 2, the shock absorber element 50 projects a little in the direction of the drive unit 44 if the valve element 24 is situated in the shut-off position 26.

As is particularly shown in FIG. 4, a hydraulic shock absorber is expediently used as a shock absorber.

A pneumatic shock absorber would also be conceivable for this. A further alterative is a mechanical shock absorber in the form of a stop element which consists of an elastically deformable material, for example plastic, in particular polyurethane.

For this, an absorber piston 62 is provided, and this is movably mounted in an interior 63 of the shock absorber housing. The absorber piston 62 is connected to a shock absorber element, in this case an absorber piston rod which is led out of the shock absorber housing. The free end of the shock absorber element is provided with an end-cap 64 which can consist for example of a plastic material. The stop surface is formed by the face-side end of the shock absorber housing which faces the end cap 64. The rear end of the shock absorber housing which is away from the end cap 64 is closed by a lid 65, on which a throttle rod 66 which projects in the axial direction in the direction of the interior 63 is fastened. The throttle rod 66 is a funnel-shaped through-opening in the absorber piston 62, into which through-opening the throttle rod which comprises a cone-shaped end section can be moved. The extension movement of absorber piston is limited via a stop which is designed as an annular disc, wherein the stop 67 is fastened to the inner wall of the shock absorber housing. An equalisation chamber 68 is also provided, into which given the retraction of the absorber piston rod, thus given the damping, hydraulic fluid can flow from the working chamber 68 via the throughflow opening in the absorber piston. An equalisation piston 69 which is biased into an initial position by way of a compression spring 70 is located in the equalisation chamber 68. The equalisation spring 70 is supported on the one hand on the equalisation piston 69 and one the other hand on a support piston 71.

FIG. 2 shows the valve element 24 in the shut-off position. In this position, the valve element 24 is pressed upon the assigned valve seat 22 by way of a spring force of the restoring spring 41. Additionally, process medium prevails on the valve element and likewise presses this onto the valve seat 22.

In order to open the valve 11, the lower working chamber 29 is subjected to pressurised air, by which means the drive unit 44 of the spindle 25, the stop plunger 42 and the drive wall 40 is pressed upwards counter to the spring force of the restoring spring 41. Herein, the upper side of the stop plunger 42 with the counter stop surface 72 comes into contact with the face side of the end cap 64 on the shock absorber element 50. Pressure impacts which on opening take place when the fluid pressure which acts against the valve element 24 depletes and the drive unit 44 rushes upwards are absorbed by the shock absorber 49 in a manner such that the counter stop surface 72 impacts the shock absorber element 50 and this element then moves into the shock absorber housing. If the set travel of the spindle 25 corresponds to the travel of the shock absorber element 50, then the shock absorber element 50 always remains in contact with the counter stop surface 72.

Herein, the absorber piston 62 moves in the direction of the rear lid 65 and the throttle rod 66 moves into the funnel-like throughflow opening in the absorber piston 62, and hydraulic fluid which is located in the working chamber is displaced via the throughflow opening and a throttling subsequently takes place by way of the overflow surface becoming continuously smaller by way of the moving-in of the throttle rod 66. The flowing-over hydraulic fluid flows over flows into the equalisation chamber 68 and moves the equalisation piston 69 in the direction of the front end of the shock absorber housing counter to the spring force of the compression spring 70. The damping effect of the shock absorber is maintained until the counter stop surface 72 hits the stop surface 46 on the face side of the shock absorber housing. This also simultaneously represents the maximally achievable opening travel of the spindle 25 and hence sets the cross section of the throughflow opening 21.

What is claimed is:

1. A valve, with a valve housing, through which process medium can flow, the valve housing having a valve seat which surrounds a throughflow opening, and the valve further including a valve element which is arranged on a spindle in a manner such that the valve element by way of an actuation travel of the spindle is movable between a shut-off position, in which the valve element sealingly bears on the valve seat in a process-medium-tight manner, and an open position, in which the valve element is lifted from the valve seat, and with a fluid-actuated valve drive which comprises a drive housing and a drive wall which together with the spindle forms a drive unit and which separates two working chambers from one another, wherein at least one of said two working chambers can be subjected to pressure, and with a travel limitation device which for limiting the opening travel of the spindle comprises a stop element which is fastened to the drive housing and which with an end section which comprises a stop surface projecting into a travel limitation space, wherein the drive unit is configured to strike upon the stop surface in the travel limitation space for limiting the opening travel, wherein the travel limitation space is constantly under atmospheric pressure and that the stop element is formed by a shock absorber housing of a shock absorber, said shock absorber being fixed to the drive housing and comprising a shock absorber element which projects in a direction toward the drive unit and is movably mounted relative to the shock absorber housing, and wherein the drive housing comprises a base housing part, a separating wall and a stop housing part, the base housing part annularly encompassing the two working chambers, and the stop housing part being connected to the base housing part via the separating wall, and wherein the shock absorber housing passes through an upper terminating wall of the stop housing part.

2. The valve according to claim 1, wherein the travel limitation space is arranged in a manner connecting axially to the two working chambers and is separated from the adjacent working chamber of said two working chambers by way of the separating wall, wherein the drive unit comprises a stop plunger configured to interact with the shock absorber element, the stop plunger passing through the separating wall in a slidingly displaceable manner.

3. The valve according to claim 1, wherein the fluid-actuated valve drive comprises a drive piston.

4. The valve according to claim 3, wherein the stop plunger of the drive unit comprises a piston rod which is connected to the drive piston.

5. The valve according to claim 1, wherein the shock absorber housing is displaceably mounted on the drive housing in an axial direction for setting the opening travel.

6. The valve according to claim 5, wherein a screw connection serves for the displaceable mounting of the shock absorber housing with respect to the drive housing.

7. The valve according to claim 1, wherein the stop housing part comprises a housing chamber which is open to the two working chambers, wherein the separating wall which together with the housing chamber forms the travel limitation space is arranged in the region of an opening of the housing chamber.

8. The valve according to claim 1, wherein the base housing part comprises a hollow-cylindrical housing body and a housing lid, the separating wall being fastened to an inner wall of the hollow-cylindrical housing body, and the housing lid having a lid opening, through which the stop housing part passes.

9. The valve according to claim 1, wherein the stop housing part is fastened to the separating wall by way of fastening means.

10. The valve according to claim 9, wherein the fastening means comprises screw fastening means.

11. The valve according to claim 1, wherein a throughflow channel, through which process medium can flow and which has a channel longitudinal axis, passes through the valve housing, and the valve seat comprises a seat surface which is aligned obliquely to the channel longitudinal axis or a spindle axis of the spindle is aligned perpendicularly to the channel longitudinal axis.

12. The valve according to claim 1, wherein the valve element in the shut-off position is arranged upstream of the throughflow opening.

13. A valve, with a valve housing, through which process medium can flow, the valve housing having a valve seat which surrounds a throughflow opening, and the valve further including a valve element which is arranged on a spindle in a manner such that the valve element by way of an actuation travel of the spindle is movable between a shut-off position, in which the valve element sealingly bears on the valve seat in a process-medium-tight manner, and an open position, in which the valve element is lifted from the valve seat, and with a fluid-actuated valve drive which comprises a drive housing and a drive wall which together with the spindle forms a drive unit and which separates two working chambers from one another, at least one of said two working chambers being subjectable to pressure, and with a travel limitation device which for limiting the opening travel of the spindle comprises a stop element which is fastened to the drive housing and which with an end section which comprises a stop surface projecting into a travel limitation space, wherein the drive unit is configured to strike upon the stop surface in the travel limitation space for limiting the opening travel, wherein a throughflow channel, through which process medium can flow and which has a channel longitudinal axis passes through the valve housing, and the valve seat comprises a seat surface which is aligned obliquely to the channel longitudinal axis or a spindle axis of the spindle is aligned perpendicularly to the channel longitudinal axis, wherein the stop element is formed by a shock absorber housing of a shock absorber, said shock absorber being fixed to the drive housing and comprising a shock absorber element which projects in a direction toward the drive unit and which is movably mounted relative to the shock absorber housing, and wherein the drive housing comprises a base housing part, a separating wall and a stop housing part, the base housing part annularly encompassing the two working chambers, and the stop housing part being connected to the base housing part via the separating wall, and wherein the shock absorber housing passes through an upper terminating wall of the stop housing part.

14. The valve according to claim 13, wherein the travel limitation space is constantly under atmospheric pressure.

15. The valve according to claim 13, wherein the valve element in the shut-off position is arranged upstream of the throughflow opening.

* * * * *